United States Patent
Bhayana et al.

(10) Patent No.: US 11,456,697 B2
(45) Date of Patent: Sep. 27, 2022

(54) SOLAR PUMPING SYSTEM AND A METHOD FOR OPERATING SOLAR PUMPING SYSTEM

(71) Applicant: DELTA ELECTRONICS INDIA PRIVATE LIMITED, Haryana (IN)

(72) Inventors: Bhupinder Kumar Bhayana, Gurugram (IN); Sumit Aggarwal, Gurugram (IN)

(73) Assignee: DELTA ELECTRONICS INDIA PRIVATE LIMITED, Gurugram (IN)

(*) Notice: Subject to any disclaimer, the term of this patent is extended or adjusted under 35 U.S.C. 154(b) by 0 days.

(21) Appl. No.: 16/193,353

(22) Filed: Nov. 16, 2018

(65) Prior Publication Data

US 2019/0165727 A1 May 30, 2019

(30) Foreign Application Priority Data

Nov. 24, 2017 (IN) .............................. 201711042254

(51) Int. Cl.
| | |
|---|---|
| *H02P 27/06* | (2006.01) |
| *H02S 40/32* | (2014.01) |
| *H02H 7/20* | (2006.01) |
| *F04B 17/00* | (2006.01) |
| *F04B 49/06* | (2006.01) |
| *F03G 6/00* | (2006.01) |

(Continued)

(52) U.S. Cl.
CPC .............. *H02S 40/32* (2014.12); *F03G 6/001* (2013.01); *F04B 17/006* (2013.01); *F04B 49/06* (2013.01); *H02H 7/20* (2013.01); *H02P 27/06* (2013.01); *F04B 49/20* (2013.01); *F04B 2203/0202* (2013.01); *H02J 1/002* (2020.01); *H02J 3/383* (2013.01); *H02J 5/00* (2013.01); *H02J 7/35* (2013.01)

(58) Field of Classification Search
CPC .... F25B 25/005; F25B 21/00; F25B 2600/13; H02M 7/53875
See application file for complete search history.

(56) References Cited

U.S. PATENT DOCUMENTS

| | | | | |
|---|---|---|---|---|
| 4,175,249 | A | * | 11/1979 | Gruber ...................... G05F 1/67 323/271 |
| 4,999,560 | A | * | 3/1991 | Morishima ............... H02P 1/30 318/778 |

(Continued)

*Primary Examiner* — Rina I Duda
(74) *Attorney, Agent, or Firm* — Kirton McConkie; Evan R. Witt

(57) ABSTRACT

A solar pumping system and a method for operating solar pumping system, the system comprises plurality of solar modules, at least one VFD comprising at least one convertor, at least one switching device connected to the solar module and the VFD and at least one AC motor connected to the output supply of the VFD. The switching device controls the supply of DC power transmitted to the VFD based on the input received from a controller of the VFD by varying the output voltage in accordance with the load requirement of the AC motor. The method comprising the steps of controlling the supply of voltage output of solar modules through the switching device as to provide adequate power to the solar pump based on the requirement of the motor in order to avoid tripping by increasing or decreasing the voltage output of the solar modules to a predetermined fraction of voltage for a predetermined fraction of time.

12 Claims, 2 Drawing Sheets

(51) Int. Cl.
  *H02J 3/38* (2006.01)
  *H02J 7/35* (2006.01)
  *F04B 49/20* (2006.01)
  *H02J 5/00* (2016.01)
  *H02J 1/00* (2006.01)

(56) References Cited

U.S. PATENT DOCUMENTS

| | | | | |
|---|---|---|---|---|
| 5,986,860 A * | 11/1999 | Scott | ............... | G01R 31/1272 361/42 |
| 6,232,742 B1 * | 5/2001 | Wacknov | ............ | H02M 3/1563 318/774 |
| 6,259,996 B1 * | 7/2001 | Haun | ............... | H02H 1/0015 702/58 |
| 6,275,403 B1 * | 8/2001 | McNulty | ........... | H02M 7/53875 363/131 |
| 7,148,650 B1 * | 12/2006 | McNulty | ............ | H02P 23/0077 318/801 |
| 7,151,656 B2 * | 12/2006 | Dvorak | ............... | H02H 1/0015 361/63 |
| 7,378,757 B2 * | 5/2008 | Nakata | ............... | H02M 7/483 307/71 |
| 8,044,538 B2 * | 10/2011 | Ragonese | ............... | H02J 1/10 307/82 |
| 8,773,156 B2 * | 7/2014 | Takada | ................... | H02S 50/10 324/761.01 |
| 9,436,201 B1 * | 9/2016 | Teirelbar | ................ | H02J 3/381 |
| 2007/0290651 A1 * | 12/2007 | McNulty | .................. | F03G 6/00 318/800 |
| 2008/0288115 A1 * | 11/2008 | Rusnak | ............... | F04D 15/0066 700/282 |
| 2011/0131989 A1 * | 6/2011 | Sampson | ............. | G05B 13/021 60/641.1 |
| 2012/0326649 A1 * | 12/2012 | Patanaik | ........... | H02M 7/53875 318/453 |
| 2013/0263613 A1 * | 10/2013 | Bittner | ................. | F25B 25/005 62/56 |
| 2014/0035377 A1 * | 2/2014 | Klein | ..................... | H02J 3/381 307/86 |
| 2014/0060616 A1 * | 3/2014 | Okandan | .......... | H01L 31/02021 136/244 |
| 2014/0111026 A1 * | 4/2014 | Despesse | ................. | H02J 1/00 307/115 |
| 2015/0214787 A1 * | 7/2015 | Gerhardinger | ............ | H02J 1/12 307/26 |

* cited by examiner

SOLAR PUMPING SYSTEM AND A METHOD FOR OPERATING SOLAR PUMPING SYSTEM

FIELD OF THE INVENTION

The present invention relates to a system and a method for operating solar pumping system, more particularly, to the solar pumping system and the method for operating solar pumping system without tripping the solar pump.

BACKGROUND OF THE INVENTION

With the recent advancement in harvesting of power through solar energy, various systems have been developed to operate the AC load from a DC source by using a converter. However, with the conversion of DC power to operate AC load, various issues are predominant such as insufficient supply of power.

In addition, the voltage derived from the solar panel is highly variable due to the long and short term variations of solar energy incident on the panel, and the electric energy generated from solar cells has different electrical characteristics from those of the traditionally electric energy as the later one has the linear voltage source characteristics which maintain a constant voltage to obtain desired operation conditions irrespective of the load conditions.

One of the leading applications of the solar power is to operate solar pumps, which generally include three phase AC motors. The load curve of the AC pump motor shifts with varying conditions, e.g. water depth, and therefore, it can be difficult to operate an AC pump motor efficiently from solar panels. The controlling of AC motors at fixed frequency is very difficult and requires power to remain constant at a given frequency, because, a change in DC voltage must be accompanied by a change in DC current.

The Variable Frequency Drive (VFD) for solar pumping application is used to control the electric motor by varying frequency and voltage supplied for efficient operation. Frequency (or hertz) is directly related to the motor's speed. In other words, the higher the frequency, the faster the revolutions per minute (RPM) of the motor thereby pumping maximum water. If an application does not require an electric motor to run at full speed, the VFD can be used to ramp down the frequency and voltage to meet the requirements of the electric motor's load which reduces the energy costs.

Further, VFD for solar pumping application are found successful for 415V AC pump motor, but it faces technical issue or failure when it is applied to 220V AC pump motor as the VFD drive trips on over voltage when the DC supply from solar cell modules crosses 390V or 395V as these VFD are designed for industrial applications where DC supply rarely goes beyond 380V.

Therefore, the object of the present invention is to solve one or more of the aforesaid issue.

SUMMARY OF THE INVENTION

Before the present invention and its component are described, it is to be understood that this disclosure is not limited to the particular system and its arrangement as described, as there may be multiple possible embodiments which are not expressly illustrated in the present disclosure. It is also to be understood that the terminology used in the description is for the purpose of describing the particular embodiments only, and it is not intended to limit the scope of the claimed subject matter.

In one embodiment, a solar pumping system is provided where the system comprises plurality of solar modules, at least one switching device connected to the solar modules, at least one VFD connected to the switching device, at least one convertor connected to the solar modules and the VFD, at least one circuit breaker connected with the solar modules and the VFD; at least one diode bridge connected with the negative side of the solar modules and the VFD; and at least one AC motor connected to the output supply of the VFD. The switching device is used to control the supply of DC power transmitted to the VFD based on the input received from the controller of the VFD regarding variation in the voltage and the load requirement of the AC motor. The switching device is controlled by the controller of the VFD to provide appropriate voltage to the AC motor where the controller is configured first to operate the switching device to provide 90% of voltage to the AC motor initially and thereafter, when the DC voltage dips due to load, full voltage is provided. In accordance to the invention the initial voltage provided to the VFD to operate, preferably at 90% of full voltage.

In another embodiment, a method for operating solar pumping system is described. The method comprises the steps of controlling the supply of voltage output of solar module through the switching device so as to provide adequate power to the solar pump based on the requirement of the AC motor in order to avoid tripping by increasing or decreasing the voltage output of the solar modules to a predetermined fraction of voltage for a predetermined fraction of time.

BRIEF DESCRIPTION OF DRAWINGS

Reference will be made to embodiments of the invention, example of which may be illustrated in the accompanying FIGURE(s). These FIGURE(s) are intended to be illustrative, not limiting. Although the invention is generally described in the context of these embodiments, it should be understood that it is not intended to limit the scope of the invention to these particular embodiments.

DETAILED DESCRIPTION OF THE INVENTION

Figure 1:
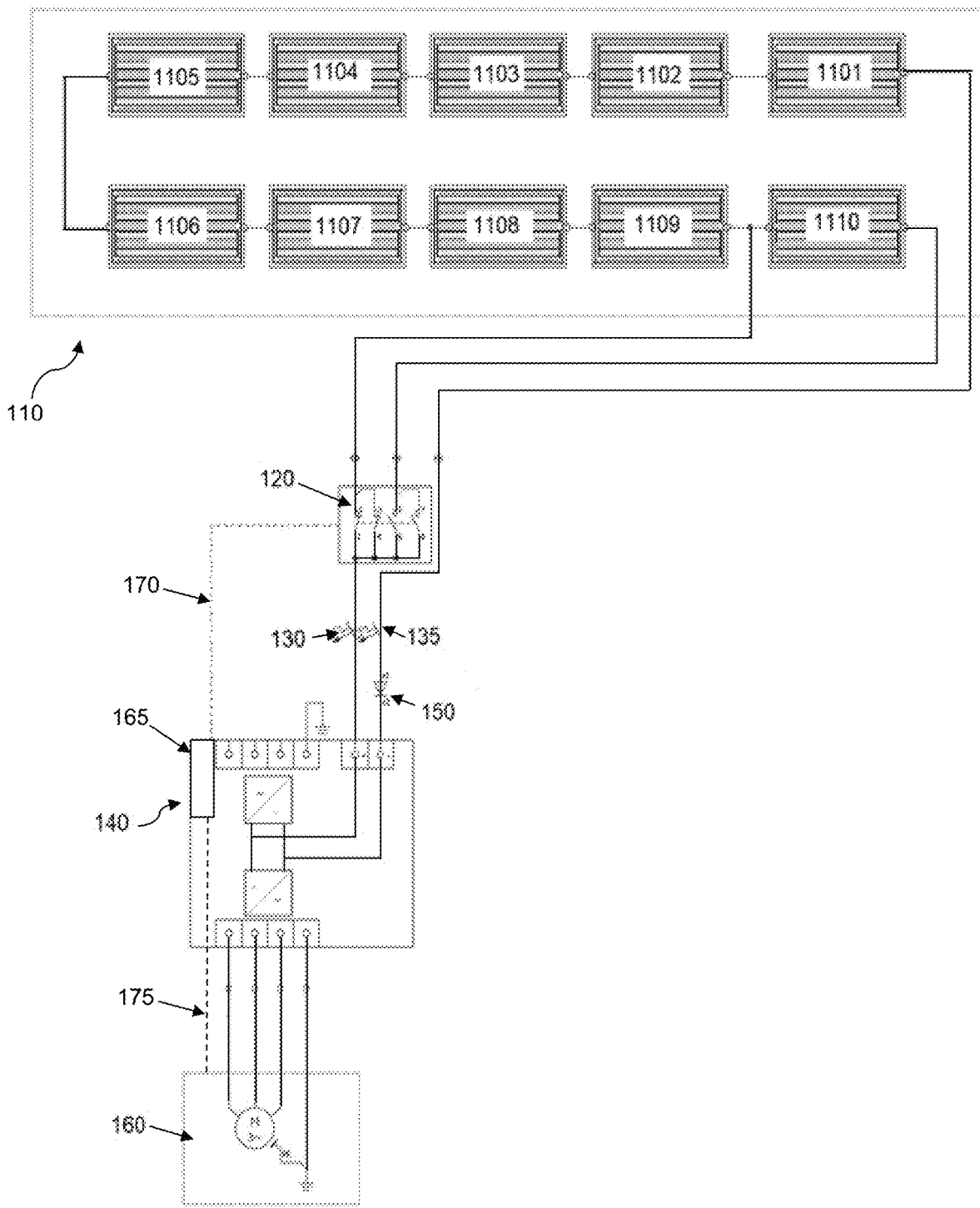
FIG. 1 shows a system for solar pumping system according to an embodiment of the present invention.

Accordingly, the present invention in an embodiment provides a solar pumping system for operating solar pumping system. The system comprises a plurality of solar modules, at least one switching device electrically connected to the solar modules, at least one VFD connected to the switching device, at least one convertor connected to the solar module and the VFD, and at least one AC motor connected to the output supply of the VFD. Advantageously, the convertor may be inbuilt in the VFD.

According to the present invention, the switching device is used to control the supply of DC voltage transmitted to the VFD based on the input received from the controller of the VFD regarding variation in the voltage. The switching device is controlled by the controller of the VFD to provide appropriate voltage to the AC motor to start with, once the DC voltage dips due to load, the controller instructs the switching device to provide full voltage after a predetermined time ranging from 15-20 seconds. The controller is configured first to operate the switching device to provide 90% of voltage to the AC motor initially and thereafter, when the DC voltage dips due to load, full voltage is provided. According to the present invention, the AC motor of various voltages can be used, such as; three phase 220V AC motor for water pumping.

In accordance to the invention, when the voltage output of the solar modules exceeds the limit of the VFD, the controller of the VFD instructs the switching device to decrease the voltage output through dividing the voltage potential by alternating the route of the current through the circuit arrangement which provides a solution to the problem of tripping of the VFD drive in case of over voltage. The controller is configured to provide instructions to the switching device in accordance with the predetermined range of the supply voltage and the load requirement of the AC motor.

According to the present invention, the system preferably includes ten solar modules connected in series to generate DC voltage ranging from at least 390V to 425V, wherein nine solar modules are used by the switching device for operating the AC motor under specified load requirements in the beginning to avoid over voltage tripping and thereafter, ten solar modules are used when the AC motor is in full load requirement. Preferably, the switching device first provides power to the VFD using nine solar modules and subsequently, after a predetermined time ranging from 15-20 seconds switches to ten solar modules to provide power to the VFD.

According to another embodiment, the invention provides a switching device connected to the solar modules on one end; and to the VFD of the system on the other end; wherein the switching device comprises the various switching means to allow the flow of the current to pass through the circuit arrangement in accordance with the requirement of the AC motor in order to avoid. The switching device utilizes the voltage output of the solar modules by dividing the voltage output for the normal load requirement and full load requirement as to operate the solar pump without tripping in case of over voltage by alternating the route of the current by operating the switching means simultaneously through the circuit arrangement upon receiving the input signal from the controller connected to the VFD which is configured to instruct the switching device in a manner where the voltage output of solar modules is divided in the beginning which comprises a predetermined percent of the full voltage for a predetermined fraction of time and when the system gets fully loaded, the switching device operates to utilize the full voltage to run AC motor without tripping in case of varying voltage output of the solar modules.

According to the present invention, the switching device may be an electromechanical device or a semiconductor device.

According to another embodiment of the present invention a method for operating solar pumping system is described. The solar pumping system having plurality of solar modules, at least one VFD having at least one convertor, at least one switching device connected to the solar modules and the VFD, at least one circuit breaker connected with the solar modules and the VFD; at least one diode bridge connected with the negative side of the solar module and the VFD; and at least one AC motor connected to the output supply of the VFD. The method for operating the solar pumping system comprising the steps of controlling the supply of voltage output of solar modules through the switching device as to provide adequate power to the solar pump based on the requirement of the motor in order to avoid tripping.

In an embodiment, the voltage output of the solar modules is increased or decreased to a predetermined percent of full voltage for a predetermined fraction of time. The switching device divides the voltage output of the solar modules and reduces it to the ninety percent in the beginning stage when the electric motor starts without load. After a predetermined duration, the switching device operates to provide the full voltage to the VFD by alternating the route of the voltage output of the solar modules and provides full voltage to the VFD which further supplies the full voltage to the AC motor running under the load.

In accordance to the invention, the controller instructs the switching device to provide the full voltage after a predetermined time ranging from 15-20 seconds.

The subject matter is now described with reference to the drawings, wherein like reference numerals are used to refer to like elements throughout. In the following description, for purpose of explanation, numerous specific details are set forth in order to provide a thorough understanding of the claimed subject matter. It may be evident however, that such matter can be practiced with these specific details. In other instances, well-known structures as shown in diagram form in order to facilitate describing the invention.

FIG. 1 shows a system (100) for solar pumping system according to an embodiment of the present invention. The system (100) shows a configuration of connection between solar modules (110), a switching device (120), a VFD (140), and an AC motor (160).

As shown in FIG. 1, the solar modules (110) are connected in series to generate a voltage depending on the requirements. For example, the solar modules (110) generate the voltage ranging from 395-425 V.

As shown in FIG. 1, the VFD (140) varies the current and voltage of the input DC voltage by varying the frequency. In an embodiment, the VFD (140) comprises a convertor (not shown) or alternatively, connected to the convertor (not shown). The convertor is used for converting the direct current to alternative current and driving the AC electric motor (160) connected to the VFD (140). The VFD (140) provides synchronization between the AC motor driven solar pump and the load requirements.

As shown in FIG. 1, the VFD (140) is connected to the solar modules (110) through the switching device (120) having circuit arrangement (1, 2), (3, 4); and (5, 6), (7, 8).

As shown in FIG. 1, the circuit arrangement (1, 2) and (3, 4) are closed and the circuit arrangement (5, 6) and (7, 8) are opened thereby allowing nine solar modules (1101, 1102, 1103, 1104, 1105, 1106, 1107, 1108, 1109) being used out of ten solar modules (1101, 1102, 1103, 1104, 1105, 1106, 1107, 1108, 1109, 1110). The switching device (120) selectively allows flow of current to pass through the circuit arrangement between (1, 2), (3, 4) and (5, 6), (7, 8) based on the required voltage output.

As shown in FIG. 1, the VFD (140) further comprises a controller (165) or alternatively, connected to the controller through signal line 170. The controller (165) controls the switching action of the switching device (120) between the circuit arrangement (1, 2), (3, 4) and (5, 6) (7, 8). The controller (165) receives signal through signal line 175 from the AC motor (160) regarding load and thereby controls the switching device (120) under a predefined load conditions.

Figure 1A:
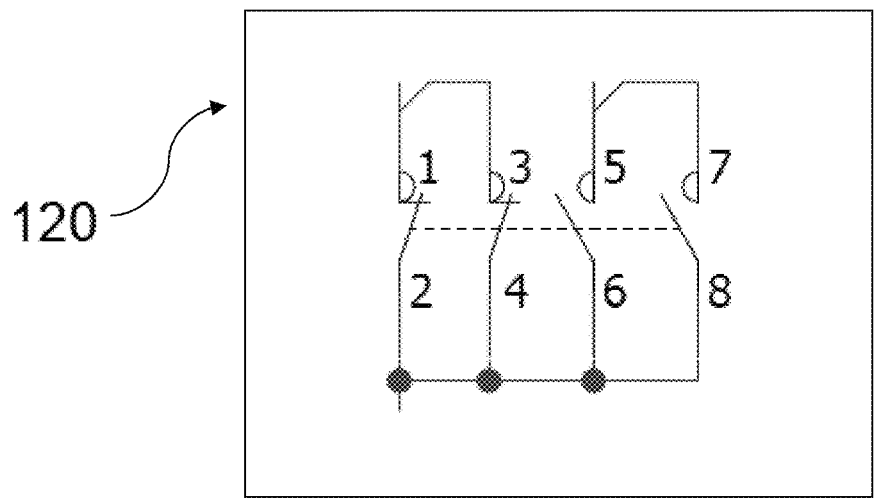
FIG. 1A is the magnified view of the circuit arrangement of the switching device which shows the flow of the current via the circuit arrangement [(1, 2), (3, 4)] when the switching device is operated to decrease the voltage output to the predetermined percent of the full voltage in accordance with an embodiment of the present invention.
Figure 1B:
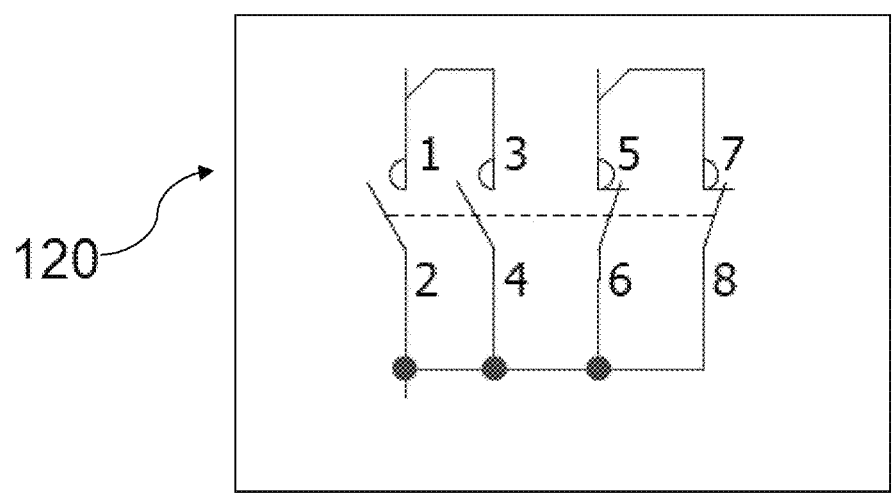
FIG. 1B is the magnified view of circuit arrangement of the switching device which shows the flow of the current via the circuit arrangement [(5, 6), (7, 8)] when the system gets fully loaded and the switching device is operated to allow flow of the current via. circuit arrangement to utilize the full voltage to run the AC motor without tripping in accordance with an embodiment of the present invention.

As shown in FIG. 1, the controller (165) actuates the switching device (120) to switch the usage of the solar modules (110) through the circuit arrangement (1, 2), (3, 4) and (5, 6), (7, 8). Upon receiving the input signal from the controller, the switching device (120) controls the circuit arrangement (1, 2), (3, 4) and (5, 6), (7, 8) thereby for operating the AC motor (160) under normal load and full load conditions. For example, while the load requirement is less than the minimum predefined value, for example 20-35% of full load, the current flows through the circuit arrangement (1, 2), (3, 4) as shown in FIG. 1A. When the load requirement exceeds the minimum predefined value, the switching devices switch to other circuit arrangement (5, 6), (7, 8) as shown in FIG. 1B to provide adequate current to the motor (160) and avoid tripping.

As shown in FIG. 1, once the DC voltage dips due to increase in load, the controller (not shown) upon receiving the input switches the current to pass through another route i.e. through circuit arrangement (5, 6) and (7, 8) which gets closed and the circuit arrangement (1, 2) and (3, 4) are opened at that time. This circuit arrangement utilizes all ten solar modules (110) connected in series in order to operate the solar pump without tripping. Initially, 90% of voltage requirement is provided and after a predetermined time ranging from 15-20 seconds, full voltage is provided due to dip in DC voltage of the solar modules (110).

As shown in FIG. 1, the system (100) further comprises a diode bridge (150) connected to the negative current side of the line connected to the solar modules (110) which allows current to flow only in one direction for avoiding the short circuit, and a Miniature Circuit Breaker (MCB) (130, 135) between the points (1, 2) and (3, 4) of the circuit to act as a circuit breaker. The MCB (130, 135) is automatically operated electrical switch designed to protect an electrical circuit from damage caused by excess current, typically resulting from an overload or short circuit. The basic function of the MCB (130, 135) is to interrupt current flow when a fault is detected.

EXAMPLE 1

The switching device of the present invention has been installed in a currently operating solar pumping system having 10 solar modules, an AC motor operating on the solar modules through VFD. It was observed that before installation, the VFD was tripping at the start, many times during various daytime instances. Upon the installation, the switching device divided the voltage output of the solar modules by utilizing the voltage output of nine out of ten solar modules to be operated as per the requirements and it was observed that the pump started on nine solar modules without tripping the VFD at various start instances and then ran smoothly, when the switching device of the VFD switched the system from nine solar modules to full voltage, and where all ten solar modules start operating after 20 seconds.

The foregoing description of the invention has been set merely to illustrate the invention and is not intended to be limiting. Since modifications of the disclosed embodiments incorporating the substance of the invention may occur to person skilled in the art, the invention should be construed to include everything within the scope of the disclosure.

We claim:

1. A solar pumping system comprising:
    a plurality of solar modules connected only in series;
    a Variable Frequency Drive (VFD) for converting DC power into AC power;
    at least one switching device having a circuit arrangement connected between the solar modules and the VFD for dividing voltage output of the solar modules to a predetermined percent of the full voltage by selectively allowing flow of current to pass through the circuit arrangement based on a required voltage output;
    at least one AC motor connected to the output supply of the VFD; and
    said VFD comprises a controller which instructs the switching device to control the output voltage of the solar modules by increasing or decreasing the voltage for a predetermined fraction of time in accordance with the load requirements in order to avoid the tripping;
    wherein the switching device is operated to decrease the voltage output to the predetermined percent of the full voltage by alternating the route of the current through the circuit arrangement in the beginning and when the system gets fully loaded, the switching device is operated to allow flow of the current via the circuit arrangement to utilize the full voltage to run the AC motor without tripping.

2. The solar pumping system as claimed in claim 1, wherein the predetermined precedent of full voltage depends upon the operating voltage of the AC motor.

3. The solar pumping system as claimed in claim 1, wherein the predetermined fraction of time ranges from 15-25 seconds.

4. The solar pumping system as claimed in claim 1, wherein the switching device can be electromechanical device or a semiconductor device.

5. The solar pumping system as claimed in claim 1, wherein the AC motor is a three phase 220V AC motor.

6. The solar pumping system as claimed in claim 1, wherein the system comprises ten solar modules to generate DC voltage ranging from at least 390V to 425V.

7. The solar pumping system as claimed in claim 6, wherein the predetermined percent of the full voltage is 90% of full voltage.

8. The solar pumping system as claimed in claim 1, wherein the system includes at least one circuit breaker connected to the solar modules and the VFD.

9. The solar pumping system as claimed in claim 1, wherein the system includes at least one diode bridge connected to the negative side of the solar modules and the VFD.

10. A switching system for a solar pumping system, said switching system comprising at least one switching device having a circuit arrangement connected between at least one solar module and the VFD of the solar pumping system, said solar pumping system having a plurality of solar modules connected only in series, a Variable Frequency Drive (VFD) for converting DC into AC, and an AC motor and a controller for operating the switching device, wherein the switching device divides the voltage output of the solar module by alternating the route of the current through the circuit arrangement in the beginning by reducing the output voltage to a predetermined percent of the full voltage for a predetermined fraction of time and when the system gets fully loaded, the controller operates the switching device to allow flow of the current via the circuit arrangement to utilize the full voltage to run the solar pumping system without tripping.

11. The switching system as claimed in claim 10, wherein the controller of the switching device can be combined with a controller of the VFD of the solar pumping system.

12. The switching system as claimed in claim 10, wherein the switching device is an electromechanical device or semi-conductor device.

\* \* \* \* \*